United States Patent [19]
Katayama

[11] Patent Number: 5,194,919
[45] Date of Patent: Mar. 16, 1993

[54] OPTICAL TYPE POSITION DETECTING DEVICE

[75] Inventor: Hiroshi Katayama, Higashihiroshima, Japan

[73] Assignee: Sharp Kabushiki Kaisha, Osaka, Japan

[21] Appl. No.: 749,663

[22] Filed: Aug. 26, 1991

[30] Foreign Application Priority Data

Aug. 28, 1990 [JP] Japan ................................. 2-227621

[51] Int. Cl.$^5$ ............................................. G01B 11/00
[52] U.S. Cl. ..................................... 356/375; 250/229; 356/373
[58] Field of Search ............... 356/373, 375; 250/229, 250/231.1, 231.19

[56] References Cited

U.S. PATENT DOCUMENTS 5,079,432  1/1992  Miller .................................. 250/229

FOREIGN PATENT DOCUMENTS 224853  6/1987  European Pat. Off. .
283002  9/1988  European Pat. Off. .
380320  8/1990  European Pat. Off. .
61-276137 12/1986 Japan .
64-79943  3/1989  Japan .
2154330  6/1990  Japan .
2260244 10/1990  Japan .

Primary Examiner—F. L. Evans

[57] ABSTRACT

An optical type position detecting device comprising a light source, and a light-receiving element for detecting a light beam emitted by the light source, a region on the light-receiving element whereon the light beam is incident having parallel boundaries, the boundaries extending in directions substantially corresponding to directions of relative displacement of the region and the light-receiving element, the relative displacement accompanying a displacement of a body. The relative displacement can be detected by detecting a change in area of the region using the light-receiving element. A magnitude of displacement of the body is proportional to a change in output of the light-receiving element since, irrespective of where the displacement of the body begins from, a contstant width of the region is maintained along a direction perpendicular with respect to the direction of the relative displacement. In other words, the displacement of the body can be accurately detected since linearity is achieved between the two.

13 Claims, 8 Drawing Sheets

OPTICAL TYPE POSITION DETECTING DEVICE

FIELD OF THE INVENTION

The present invention relates to an optical type position detecting device which detects the position of a body by a light beam which is incident upon a light-receiving element. More specifically, the present invention relates to an optical type position detecting device which is used to detect the position of an objective lens by an optical head used in an optical disk device such as a compact disk device.

BACKGROUND OF THE INVENTION

In an optical head used for performing recording or reproduction on/from an optical disk, focusing adjustment and tracking adjustment are performed by an actuator which drives an objective lens. The objective lens is driven based on the detection of position deviations of a focusing direction and a tracking direction of a light spot irradiated on the optical disk. The detection of the position deviations is carried out by allowing light reflected from the optical disk to fall on a light-receiving element.

When the objective lens shifts in the tracking direction during tracking adjustment, an irradiated position on the light-receiving element, whereon the light is incident, also moves since the light reflected from the optical disk also shifts. The light reflected from the optical disk shifts because the center of the objective lens is displaced away from the center of light emitted by the light source. As a result, even if the tracking position of a light spot is correct, an erroneous tracking error signal is generated.

In order to prevent this from happening, Japanese Laid-Open Publication No. 79943 (1989) (Tokukaisho 64-79943) discloses an optical type position detecting device which is installed in the optical head. In this optical type position detecting device, a second light source (for example) is attached to the actuator and a second light-receiving element is set to a specified position. The second light source is provided to be separate from the light source which is used for recording and reproduction on/from the optical disk, and the second light-receiving element is provided so as to be separate from the light-receiving element which detects the light reflected from the optical disk. A light beam emitted by the second light source forms a light spot on the second light-receiving element and the movement of the actuator is detected by detecting the displacement of the light spot on the second light-receiving element. Using such an optical type position detecting device causes the erroneous tracking error signal which is generated with the displacement of the objective lens along the tracking direction to be cancelled. An accurate tracking error signal is thereby achieved.

As shown in FIG. 14, a knife edge member 5 can, for example, be used in the optical type position detecting device. That is, a light beam 2 having a substantially circular cross section is emitted by a light source 1 (such as a light emitting diode or a laser). The light beam 2 forms a light spot 4 (shown by hatching) on a light-receiving element 3. A portion of the light beam 2 emitted by the light source 1 is interrupted by the knife edge member 5. Here, if for example the light source 1 and the light-receiving element 3 are made immovable and the knife edge member 5 is displaced along an x-axis, the area covered by the light spot 4 changes since the amount of light interrupted by the knife edge member 5 changes as the knife edge member 5 is displaced along the x-axis. Consequently, the change of position of the knife edge member 5 is detected as a change in output of the light-receiving element 3.

A displacement of the light source 1 along the x-axis can likewise be detected as a change in output of the light-receiving element 3 by making the knife edge member 5 and the light-receiving element 3 immovable.

Further, as shown in FIG. 18, a light-receiving element 6 conventionally in use is separated into four light-receiving sections 6a, 6b, 6c and 6d by parting lines 6e and 6f which are respectively parallel to an x-axis and a y-axis. In this case, the light-receiving element 6 is made immovable. As a result, when a light source 1 is moved along the x-axis, outputs of the light-receiving sections 6a and 6d increase and outputs of the light-receiving sections 6b and 6c decrease since a light spot 7 (shown by hatching) formed by a light beam 2 shifts along the x-axis. Thus, a displacement of the light source 1 along the x-axis can be detected by comparing the sum of the outputs of the light-receiving sections 6a and 6d with the sum of the outputs of the light-receiving sections 6b and 6c. Moreover, when the light source 1 shifts along the y-axis, a displacement of the light source 1 along the y-axis can be detected by comparing the sum of the outputs of the light-receiving sections 6a and 6b with the sum of the outputs of the light-receiving sections 6c and 6d. In other words, the light-receiving element 6 which is separated into the four light-receiving sections 6a to 6d can detect two-dimensional displacement.

In the configuration shown in FIG. 14, the light spot 4 becomes semi-circular when a half of the light beam 2 from the light source 1 is interrupted by the knife edge member 5. A region shown by hatching in FIG. 15 indicates a reduction in the area of the light spot 4 when the knife edge member 5, hitherto in the state described above, is displaced by $\Delta x$ along the x-axis. $\Delta x$ is the displacement of a projection on the light-receiving element 3 of the knife edge member 5.

A region shown by hatching in FIG. 16 indicates a reduction in the area of the light spot 4 when the knife edge member 5 is displaced by $\Delta x$ along the x-axis, the knife edge member 5 initially being in a state wherein more than half the light beam 2 is being interrupted by the knife edge member 5.

As is evident from FIGS. 15 and 16, the magnitude of the reduction in the area of the light spot 4 due to a given displacement of the knife edge member 5 varies depending on the position of the knife edge member 5 before the displacement takes place. Accordingly, since the output of the light-receiving element 3 is proportional to the area covered by the light spot 4, the change in the output of the light-receiving element 3, due to a given displacement of the knife edge member 5, differs depending on the initial position of the knife edge member 5. This is due to the fact that the far-field pattern of the light source 1 is circular (or elliptical).

FIG. 17 shows a change in the output of the light-receiving element 3 when the knife edge member 5 is displaced along the x-axis with the light source 1 and light-receiving element 3 fixed so as to be immovable. The vertical axis shows the output of the light-receiving element 3. The horizontal axis shows the position of the knife edge member 5. The position of the knife edge member 5 when the edge of the knife edge member 5 passes through a center of the light beam 2 corresponds to zero on the horizontal axis. As is clear from the diagram, linearity between the output of the light-receiving element 3 and the position of the knife edge member 5 decreases sharply as the knife edge member 5 is displaced away from the center of the light beam 2. In the figure, r is the radius of the light beam 2 on a plane in which the knife edge member 5 lies.

Further, in the configuration shown in FIG. 18, when the light source 1 is displaced along the x-axis with the light-receiving element 6 fixed so as to be immovable, as shown graphically in FIG. 19, linearity is not achieved between the position of the light source 1 along the x-axis and a differential output of the light-receiving element 6 ((the sum of the outputs of the light-receiving sections 6a and 6d)−(the sum of the outputs of the light-receiving sections 6b and 6c)). Moreover, when the light source 1 is displaced along the y-axis with the light-receiving element 6 fixed so as to be immovable, the relationship between the position of the light source 1 along the y-axis and a differential output of the light-receiving element 6 ((the sum of the outputs of the light-receiving sections 6a and 6b)−(the sum of the outputs of the light-receiving sections 6c and 6d)) resembles that shown in FIG. 19, and linearity is similarly not achieved.

As described above, in the conventional optical type position detecting device, the change in the output of the light-receiving element 3 differs even when the magnitude of the displacement of the knife edge member 5 (see FIG. 14) is the same. As a result, accurate detection of the magnitude of displacement becomes difficult. Also, the change in the output of the light-receiving element 6 differs even when the magnitude of the displacement of the light source 1 (see FIG. 18) is the same. In this case too, accurate detection of the magnitude of displacement becomes difficult.

A degree of linearity is achieved between the position of the knife edge member 5 and the output of the light-receiving element 3 when the edge of the knife edge member 5 is in the vicinity of the center of the light beam 2. Furthermore, a degree of linearity is achieved between the position of the light spot 7 and the output of the light-receiving element 6 when the light spot 7 is in the vicinity of the center of the light-receiving element 6. However, in this case, a problem remains in that the detectable range of the magnitude of the displacement of the knife edge member 5 or of the light spot 7 becomes narrow.

SUMMARY OF THE INVENTION

An object of the present invention is to provide an optical type position detecting device which can accurately detect the position of a body.

In order to attain the above object, an optical type position detecting device of the present invention comprises a light source, and a light-receiving element for detecting a light beam emitted by the light source, the optical type position detecting device being characterized in that a region where the light beam is incident upon the light-receiving element has parallel boundaries, these boundaries extending in directions substantially corresponding to directions of relative displacement of the region and the light-receiving element, the relative displacement accompanying a displacement of a body.

With the above arrangement, the relative displacement can be detected by detecting a change in area of the region. A magnitude of displacement of the body remains proportional to a change in output of the light-receiving element since a constant width of the region is maintained (irrespective of where the displacement of the body begins from) along a direction perpendicular with respect to the direction of the relative displacement. In other words, the displacement of the body can be accurately detected since linearity is achieved between the two.

For a fuller understanding of the nature and advantages of the invention, reference should be made to the ensuing detailed description taken in conjunction with the accompanying drawings.

BRIEF DESCRIPTION OF THE DRAWINGS

FIG. 1 shows a schematic front view of an optical type position detecting device.

FIG. 2 shows a schematic front view of a change in area of a region, accompanying a displacement of a light spot.

FIG. 5 is a schematic perspective view of an optical type position detecting device.

FIG. 6 is an explanatory view showing a filter member and a transmittance distribution thereof.

FIG. 7 is an explanatory view showing the distribution of light intensity over a cross section of a light beam.

FIG. 8 is an explanatory view showing a filter member and a transmittance distribution thereof.

FIG. 9 is a schematic perspective view of an optical type position detecting device.

FIG. 10 is a schematic front view showing a light interrupting plate.

FIG. 11 is a schematic front view showing relative positions of a region and a light-receiving element.

FIG. 12 is a schematic perspective view of an optical type position detecting device.

FIG. 13 is a schematic front view showing relative positions of a region and a light-receiving element.

FIG. 14 is a schematic perspective view of an optical type position detecting device.

FIGS. 15 and 16 are explanatory views respectively showing changes in area of a region whereon a light spot is irradiated, the changes accompanying displacements of a knife edge member.

FIG. 17 is a graph showing the relationship between the position of the knife edge member and the output of the light-receiving element.

FIG. 18 is a schematic perspective view of an optical type position detecting device.

FIG. 19 is a graph showing the relationship between the displacement of a light source and the output of a light-receiving element.

DESCRIPTION OF THE EMBODIMENTS

A first embodiment of the present invention is described hereinbelow, referring to FIGS. 1 and 2.

Figure 1:
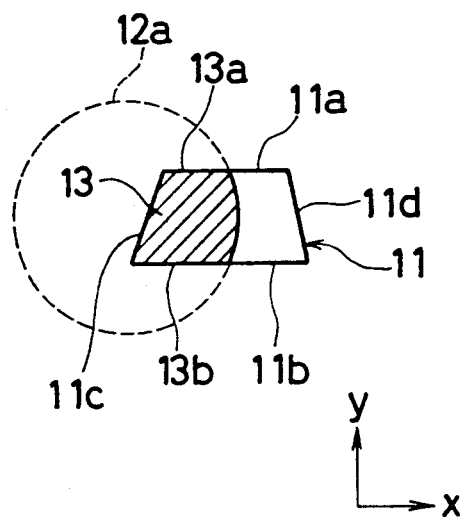
FIGS. 1 and 2 show a first embodiment of the present invention.
Figure 2:
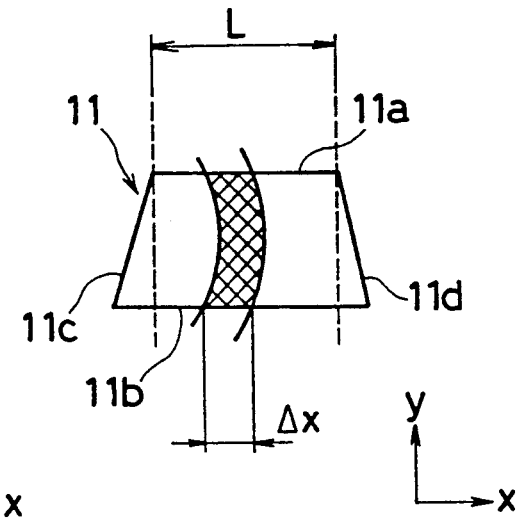

As shown in FIG. 1, an optical type position detecting device of the present embodiment comprises a light source (not shown) such as a light emitting diode or a laser diode, and a light-receiving element 11. The light-receiving element 11 is trapezoid in shape and has four sides 11a, 11b, 11c and 11d. The two opposing sides 11a and 11b are parallel and extend along an x-axis.

A light beam emitted by the light source forms a substantially circular light spot 12a on a plane which includes the light-receiving element 11. A region 13 of the light-receiving element 11, whereon the light beam is irradiated, has boundaries 13a and 13b. The boundaries 13a and 13b are parallel since they are sections of the sides 11a and 11b respectively.

This optical type position detecting device may be used as a one-dimensional detecting device for detecting a displacement of the light source along the x-axis. As is clear from FIG. 2, due to the fact that a width of the region 13 along a y-axis is constant within a range L (the sides 11a and 11b being parallel within the range L), if a displacement (indicated in FIG. 2 by $\Delta x$) of the light spot 12a taking place along the x-axis accompanying the displacement of the light source is constant, then a change in area of the region 13 (shown by hatching in FIG. 2) is constant within the range L. Consequently, linearity is achieved between the magnitude of the displacement of the light source and a change in output of the light-receiving element 11. The displacement of the light source can thereby be detected more accurately.

The optical type position detecting device may be used for example in an optical head of an optical disk device (not shown) in order to detect a magnitude of shift in a tracking direction (a direction perpendicular to a direction of recording tracks) of an actuator when the actuator drives an objective lens in the tracking direction. In this case, either the light source or the light-receiving element 11 may for example be attached to the actuator, the other being immovably fixed. Alternatively, both the light source and the light-receiving element 11 may be immovably fixed and a reflecting mirror may be attached to the actuator, the reflecting mirror reflecting the light beam from the light source toward the light-receiving element 11.

In each of the embodiments described hereinbelow, the dispositions of the light source, the light-receiving element etc. are not described. These may be disposed as in the first embodiment.

Figure 3:
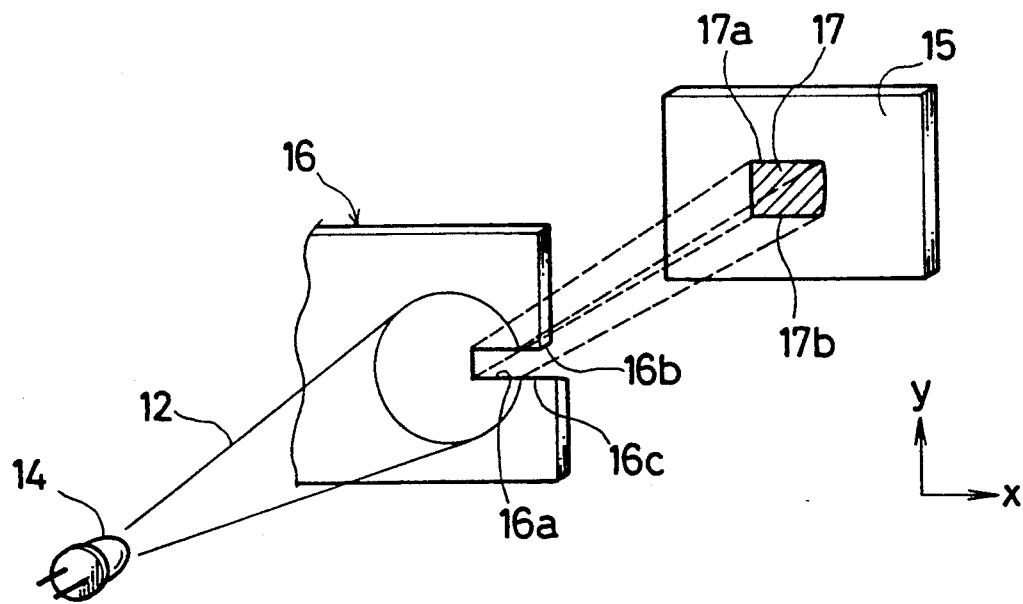
FIG. 3 shows a second embodiment of the present invention and is a schematic perspective view of an optical type position detecting device.

A second embodiment of the present invention is described hereinbelow, referring to FIG. 3.

An optical type position detecting device of the present embodiment comprises a light source 14, a light-receiving element 15, and a light interrupting plate 16 serving as a light interrupting member provided between the light source 14 and the light-receiving element 15. The light interrupting plate 16 has an opening 16a which is substantially rectangular in shape. The opening 16a has two sides 16b and 16c which are parallel and extend along the x-axis.

A light beam 12 having a substantially circular cross section is emitted by the light source 14. A portion of the light beam 12 passes through the opening 16a and is incident on the light-receiving element 15. A region 17 on the light-receiving element 15 whereon the portion of the light beam 12 is incident has boundaries 17a and 17b. Since the boundaries 17a and 17b are projections of the sides 16b and 16c, they are parallel and extend along the x-axis. This optical type position detecting device may be used as a one-dimensional detecting device for detecting a displacement of the light source 14 along the x-axis.

In the present embodiment as well, a width along the y-axis of the region 17 is constant. Consequently, as long as the displacement of the light beam 12 takes place within the opening 16a, the magnitude of the displacement of the light beam 12 along the x-axis and the change in area of the region 17 remain proportional. As a result, linearity is achieved between the magnitude of the displacement of the light source 14 and the change in output of the light-receiving element 15.

A third embodiment of the present invention is described hereinbelow, referring to FIG. 4. For the sake of convenience, members having the same function as in the aforementioned embodiment will be designated by the same code and their description will be omitted.

Figure 4:
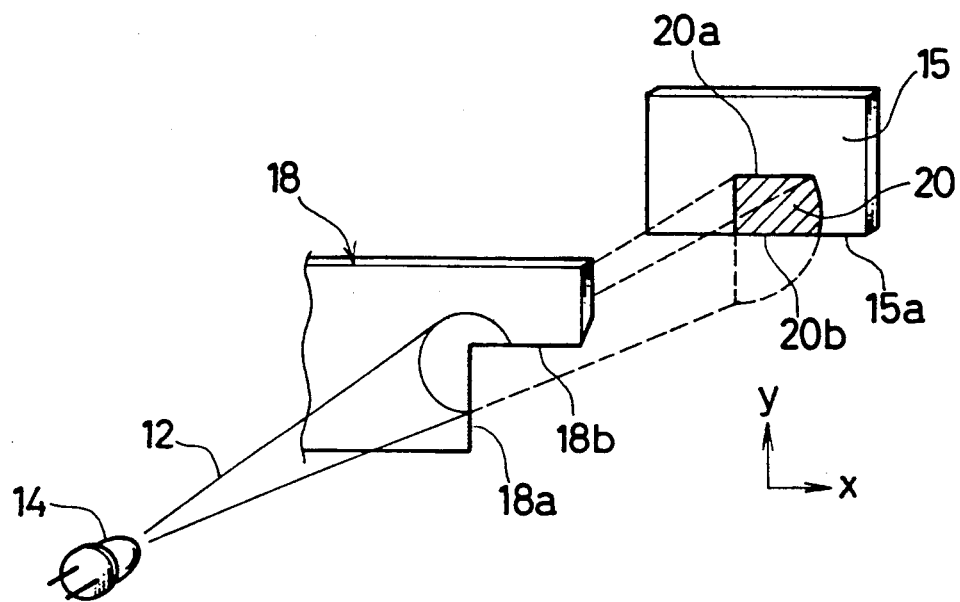
FIG. 4 shows a third embodiment of the present invention and is a schematic perspective view of an optical type position detecting device.

As shown in FIG. 4, an optical type position detecting device of the present embodiment comprises a light source 14, a rectangular light-receiving element 15, and a light interrupting plate 18, serving as a light interrupting member, disposed between the light source 14 and the light-receiving element 15. A rectangular cutaway section 18a is cut into the light interrupting plate 18.

A light beam 12 having a substantially circular cross section is emitted by the light source 14. A portion of the light beam 12 passes through the cutaway section 18a and is incident on the light-receiving element 15. A region 20 on the light-receiving element 15 whereon the portion of the light beam 12 is incident has boundaries 20a and 20b. The boundaries 20a and 20b are parallel and extend along the x-axis. This is because the boundary 20a is a projection of the side 18b (which extends along the x-axis) of the cutaway section 18a; and because the boundary 20b is a part of a side 15a (which extends along the x-axis) of the light receiving element 15.

This optical type position detecting device may be used as a one-dimensional detecting device for detecting a displacement of the light source 14 along the x-axis. As in the first and second embodiment, linearity is achieved between the magnitude of the displacement of the light source 14 along the x-axis and a change in output of the light-receiving element 15.

Furthermore, since the length of the sides 16b, 16c (see FIG. 3) and 18b can be set and changed easily, a desired range within which linearity is to be achieved may accordingly be set freely. It is also possible to introduce nonlinearity at specified positions between the magnitude of the displacement of the respective light sources 14 along the x-axis and the change in the output of the respective light-receiving element 15 by making (in the case of the second embodiment) the sides 16b and 16c and (in the case of the third embodiment) the side 18b partially nonlinear.

A fourth embodiment of the present invention is described hereinbelow, referring to FIGS. 5 and 6. For the sake of convenience, members having the same function as in the aforementioned embodiment will be designated by the same code and their description will be omitted.

Figure 5:
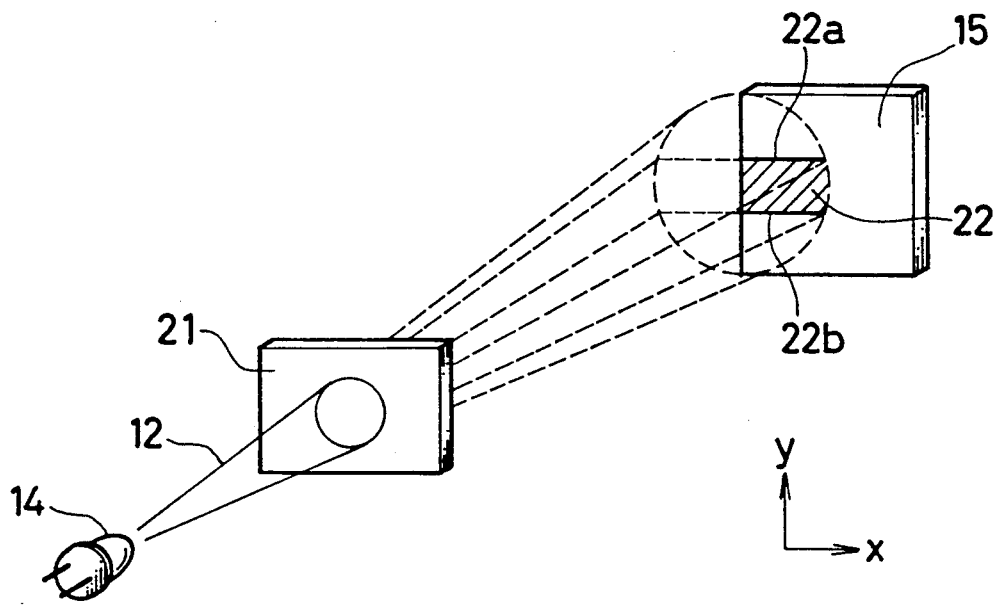
FIGS. 5 and 6 show a fourth embodiment of the present invention.

As shown in FIG. 5, an optical type position detecting device of the present embodiment comprises a light source 14, a light-receiving element 15, and a filter member 21 disposed between the light source 14 and the light-receiving element 15.

Figure 6:
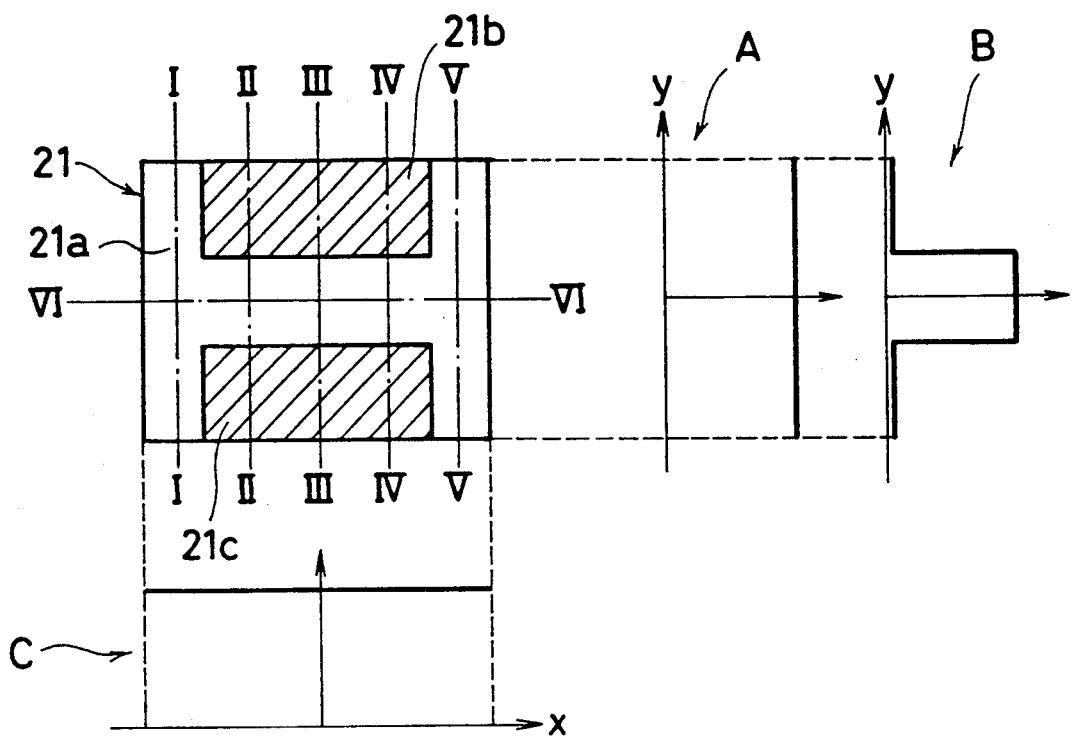

As shown in FIG. 6, the filter member 21 has a substantially H-shaped first section 21a, and second and third sections 21b and 21c (shown by hatching in FIG. 6) which are rectangular. Transmittance is high and constant (as shown by graph A in FIG. 6) in the first section 21a along alternate long and short dash lines I—I and V—V which are parallel to the y-axis. Further, transmittance along alternate long and short dash lines II—II, III—III and IV—IV (also parallel to the y-axis) is high in the first section 21a and low in the second and third sections 21b and 21c (as shown by graph B). Finally, transmittance is high and constant (as shown by graph C) along an alternate long and short dash line VI—VI which is parallel to the x-axis. In other words, the second and third sections 21b and 21c (shown by hatching) of the filter member 21 have a lower transmittance compared to first section 21a.

A light beam 12 is emitted by the light source 14. The light beam 12 is incident upon the filter member 21 on a part excluding extreme ends, which are the vertical parts (located along the alternate long and short dash lines I—I and V—V) of the substantially H-shaped first section 21a. As a result, when a portion of the light beam 12 is transmitted through the filter member 21, the light beam 12 becomes circular-arc shaped at the two ends along the x-axis (i.e., along the alternate long and short dash line VI—VI). After being transmitted through the filter member 21, the light beam 12 becomes incident upon a plane which includes the light-receiving element 15. A region 22 on the light-receiving element 15 whereon the light beam 12 is incident has two boundaries 22a and 22b, as shown by hatching in FIG. 5. The boundaries 22a and 22b are parallel and extend along the x-axis. They are parallel because the boundary 22a is a projection of a boundary line between the first section 21a and the second section 21b, and the boundary 22b is a projection of a boundary line between the first section 21a and the third section 21c.

This optical type position detecting device may be used as a one-dimensional detecting device for detecting a displacement of the light source 14 along the x-axis. Linearity is thereby achieved between a magnitude of displacement of the light source 14 and a change in output of the light-receiving element 15.

Figure 7:
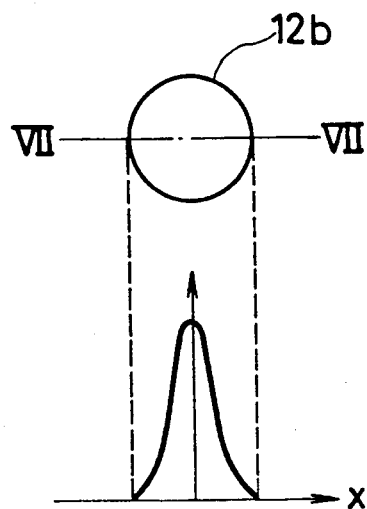
FIGS. 7 and 8 show a fifth embodiment of the present invention.

A fifth embodiment of the present invention is described hereinbelow, referring to FIGS. 7 and 8. For the sake of convenience, members having the same function as in the aforementioned embodiment will be designated by the same code and their description will be omitted.

An optical type position detecting device of the present embodiment is a variation of the optical type position detecting device of the fourth embodiment. As shown in FIG. 7, consider a case where the light intensity of a light beam 12 emitted by a light source 14 is strong over the center of a cross section 12b and gradually becomes weaker as the circumference thereof is approached, the light intensity being measured along an alternate long and short dash line VII—VII which is parallel to an x-axis and passes through the center of the cross section 12b. Here, the light intensity along the x-axis in a region 22 (see FIG. 5) on a light-receiving element 15 also becomes ununiform. Consequently, even if boundaries 22a and 22b of the region 22 are parallel, linearity ceases to exist between a magnitude of displacement of the light source 14 and a change in output of the light-receiving element 15.

Figure 8:
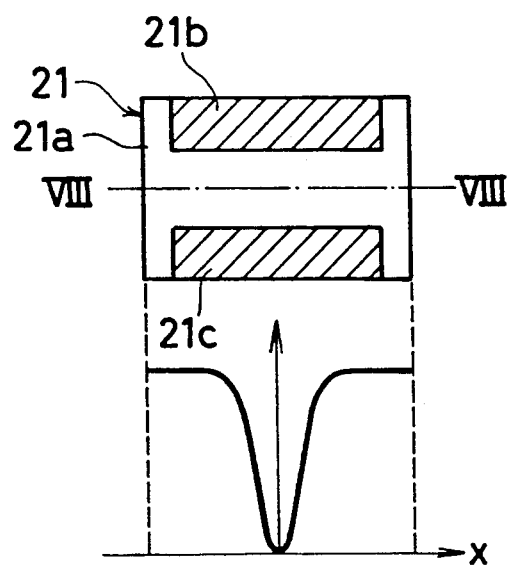

In a case where the cross section 12b of the light beam 12 has such a distribution of light intensity along the x-axis, it is arranged, as shown in FIG. 8, so that a first section 21a of a filter member 21 has a transmittance distribution whereby the transmittance along an alternate long and short dash line VIII—VIII (which is parallel to the x-axis) is low at a central part and becomes higher as the two vertical ends of the H-shaped first section 21a are approached. The transmittance distribution should be such that a portion of the light beam 12 which is transmitted through the filter member 12 acquires a substantially uniform distribution of light intensity along the x-axis. Linearity is accordingly achieved between the magnitude of the displacement of the light source 14 and the change in the output of the light-receiving element 15. In the present embodiment, the filter member 21 and the light source 14 may be displaced integrally with respect to the light-receiving element 15. Alternatively, only the light-receiving element 15 may be displaced.

A sixth embodiment of the present invention is described hereinbelow, referring to FIGS. 9 to 11. For the sake of convenience, members having the same function as in the aforementioned embodiment will be designated by the same code and their description will be omitted.

Figure 9:
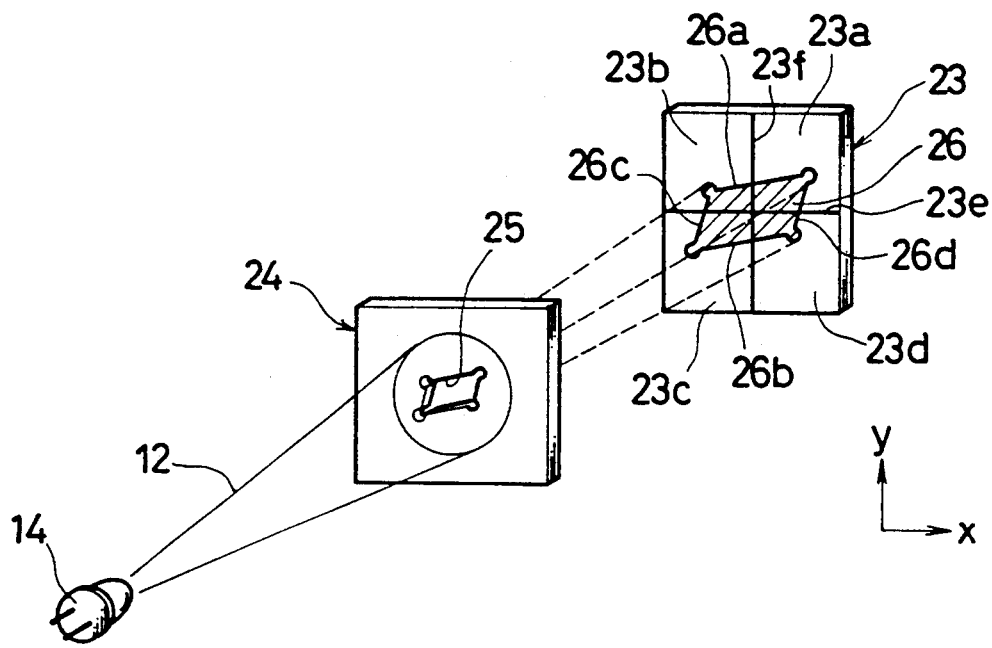
FIGS. 9 to 11 show a sixth embodiment of the present invention.

As shown in FIG. 9, an optical type position detecting device of the present embodiment comprises a light source 14; a light-receiving element 23 separated into four light-receiving sections 23a, 23b, 23c and 23d by two parting lines 23e and 23f which are respectively parallel to an x-axis and a y-axis; and a light interrupting plate 24, serving as a light interrupting member, disposed between the light source 14 and the light-receiving element 23.

Figure 10:
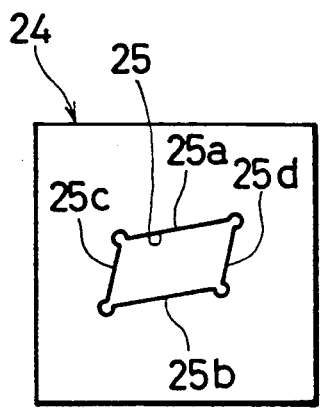
Figure 11:
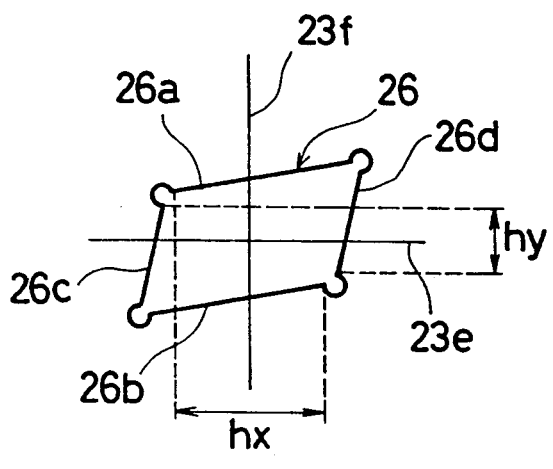

As shown in FIG. 10, an opening 25 shaped substantially like a parallelogram is formed in the light interrupting plate 24. The opening 25 accordingly has two parallel pairs of sides 25a-25b and 25c-25d. In other words, the sides 25a and 25b are parallel, and the sides 25c and 25d are parallel. The sides 25a to 25d may be inclined with respect to the x-axis as well as the y-axis.

A light beam 12 is emitted by the light source 14. A portion of the light beam 12 is incident upon the light-receiving element 23 after passing through the opening 25 of the light interrupting plate 24. As shown by hatching in the FIG. 9, a region 26 on the light-receiving element 23, whereon the portion of the light beam 12 is incident, has boundaries 26a, 26b, 26c and 26d. A pair 26a-26b and and a pair 26c-26d of the boundaries are parallel pairs since the boundaries 26a to 26d are projections of the sides 25a to 25d respectively, the pairs of the sides 25a-25b and 25c-25d being parallel pairs.

This optical type position detecting device may be used as a two-dimensional detecting device for detecting a displacement of the light source 14 along the x-axis and the y-axis. Since linearity is to be achieved between a magnitude of displacement of the light source 14 and a change in output of the light-receiving element 23, it is necessary that the boundaries 26a and 26b of the region 26 cross the parting line 23f and that the boundaries 26c and 26d of the region 26 cross the parting line 23e. In other words, as shown in FIG. 11, as long as the crossing point of the two parting lines 23e and 23f lies within a range $h_x$ in which the boundaries 26a and 26b are parallel, linearity is achieved between the output and the displacement along the x-axis. Further, as long as the crossing point of the two parting lines 23e and 23f lies within a range $h_y$ in which the boundaries 26c and 26d are parallel, linearity is achieved between the output and the displacement along the y-axis.

In the present embodiment, either only the light interrupting plate 24 is displaced or the light interrupting plate 24 and the light source 14 are displaced integrally.

A seventh embodiment of the present invention is described hereinbelow, referring to FIGS. 12 and 13. For the sake of convenience, members having the same function as in the aforementioned embodiment will be designated by the same code and their description will be omitted.

Figure 12:
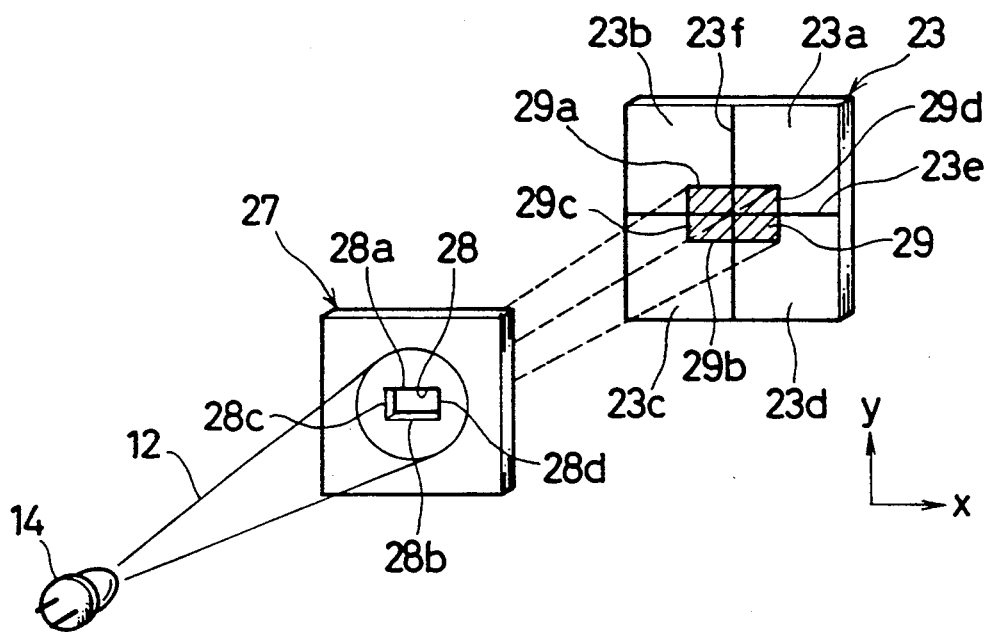
FIGS. 12 and 13 show a seventh embodiment of the present invention.

As shown in FIG. 12, an optical type position detecting device of the present embodiment comprises a light source 14; a light-receiving element 23 separated into four light-receiving sections 23a, 23b, 23c and 23d by two parting lines 23e and 23f which are respectively parallel to an x-axis and a y-axis; and a light interrupting plate 27 serving as a light interrupting member and disposed between the light source 14 and the light-receiving element 23. A rectangular opening 28 has been opened in the light interrupting plate 27. The opening 28 has a parallel pair of sides 28a-28b which extend along the x-axis, and a parallel pair of sides 28c-28d which extend along the y-axis.

A light beam 12 is emitted by the light source 14. A portion of the light beam 12 passes through the opening 28 of the light interrupting plate 27 and is incident upon the light-receiving element 23. As shown by hatching in FIG. 12, a region 29 on the light-receiving element 23, whereon portion of the light beam 12 is incident, has four boundaries 29a, 29b, 29c and 29d. Each pair of the boundaries 29a-29b and 29c-29d is parallel since the boundaries 29a to 29d are projections of the sides 28a to 28d respectively, the pairs of the sides 28a-28b and 28c-28d being parallel pairs. The boundaries 29a and 29b extend along the x-axis and the boundaries 29c and 29d extend along the y-axis. Since the region 29 is a perfect rectangle (it may equally be a square), as shown by FIG. 13, as long as the crossing point of the parting lines 23e and 23f is in a range $l_x$ in which the boundaries 29a and 29b are parallel and as long as the crossing point of the parting lines 23e and 23f is in a range $l_y$ in which the boundaries 29c and 29d are parallel (in other words, as long as the crossing point lies in the region 29), linearity is achieved between a magnitude of displacement of the light source 14 and a change in output of the light-receiving element 15.

Figure 13:
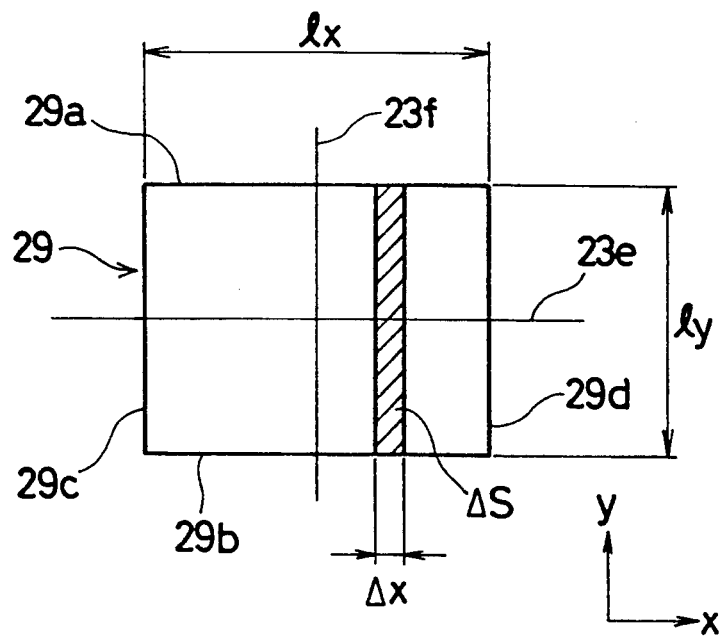
Figure 14:
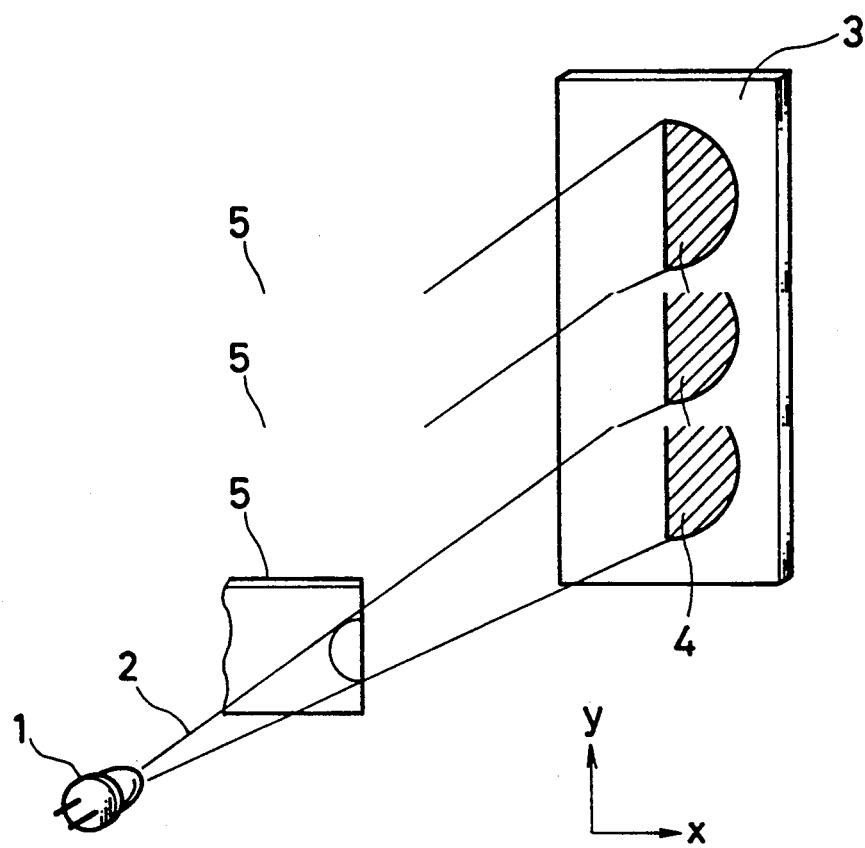
FIGS. 14 to 17 show a conventional example.
Figure 15:
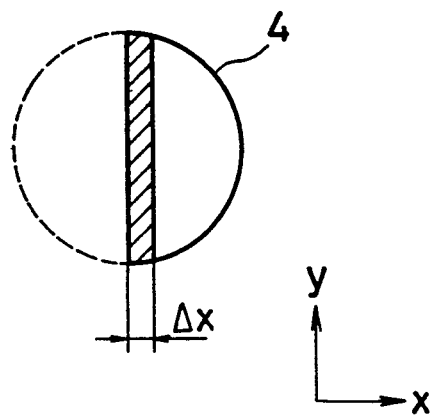
Figure 16:
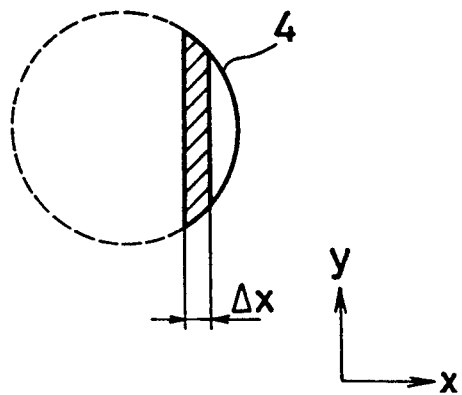
Figure 17:
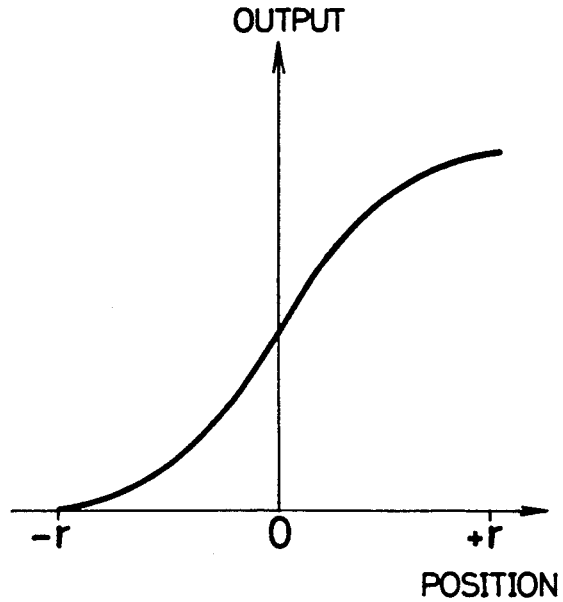
Figure 18:
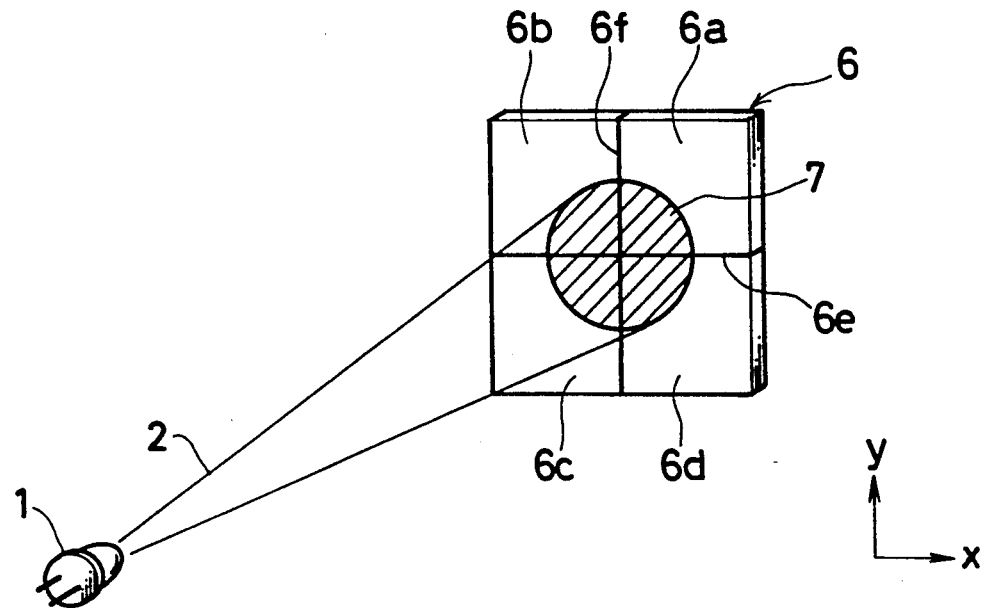
FIGS. 18 and 19 show another conventional example.
Figure 19:
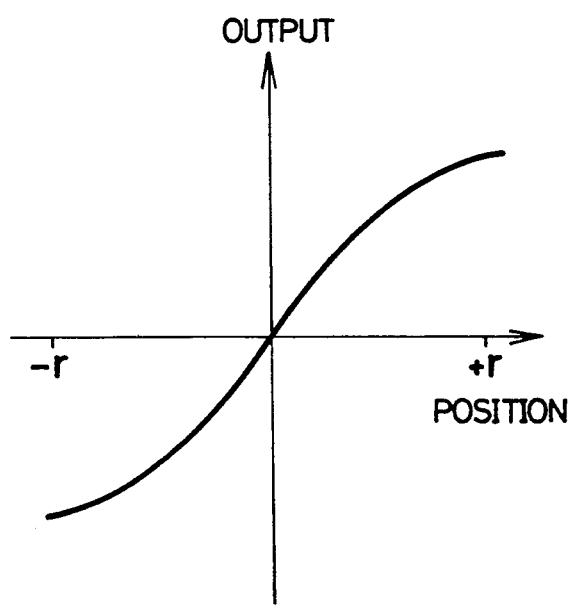

As shown in FIG. 13, suppose that $\Delta x$ is the displacement along the x-axis of the region 29 accompanying the displacement of the light source 14 along the x-axis; and that $\Delta S$ is a corresponding change in area (shown by hatching in FIG. 13). Then, $\Delta S = \Delta x \cdot l_y$. Since a change in the output of the light-receiving element 23 is proportional to $\Delta S$, the change in the output of the light-receiving element 23 remains proportional to $\Delta x$ as long as $l_y$ remains constant and as long as the crossing point of the parting lines 23e and 23f lies within the region 29. With respect to a displacement ($\Delta y$) along the y-axis, similarly, a change in the output of the light-receiving element 23 remains proportional to $\Delta y$ as long as $l_x$ remains constant and as long as the crossing point of the parting lines 23e and 23f lies within the region 29.

In the present embodiment as well, either only the light interrupting plate 27 is displaced, or the light source 14 and the light interrupting plate 27 are displaced integrally.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. An optical type position detecting device comprising:

a light source; and a light-receiving element for detecting a light beam emitted by said light source;

said light-receiving element including a light-receiving section;

said light-receiving section having parallel sides, said sides being set to extend in directions substantially corresponding to directions of relative displacement of said light-receiving element and a region on the light-receiving element whereon the light beam is incident, a distance between said sides being set to be smaller than a size of a cross section of said light-receiving element of the light beam incident thereon so that boundaries of the region are formed by parts of said sides, a relative displacement being detected by using said light-receiving element to detect a change in area of the region, the change in the area accompanying the relative displacement.

2. An optical type position detecting device comprising:

a light source;

a light-receiving element for detecting a light beam emitted by said light source; and region setting means for setting a region on said light-receiving element, whereon the light beam is incident, so that the boundaries of the region are parallel and for setting the boundaries to extend in directions substantially parallel to a direction of relative displacement of the region and said light-receiving element;

said relative displacement being detected by using said light-receiving element to detect a change in area of the region, the change in the area accompanying the relative displacement.

3. The optical type position detecting device as set forth in claim 2, wherein said region setting means consists of a light interrupting member disposed between said light source and said light-receiving element, in a path of the light beam;

said light interrupting member having an opening which includes parallel sides;

said sides extending in directions substantially parallel to a direction of the relative displacement of the region and said light-receiving element, a distance between said sides being set to be smaller than a size of a cross section of said light-interrupting member of the light beam incident thereon.

4. The optical type position detecting device as set forth in claim 2, wherein said region setting means consists of a filter member disposed between said light source and said light-receiving element, in a path of the light beam;

the filter member having a first section which allows the light beam to be easily transmitted and a second section which, compared to said first section, prevents the light beam from being transmitted easily;

said first section and said second section being separated by parallel boundary lines;

said boundary lines extending in directions substantially corresponding to the directions of the relative displacement, a distance between the boundary lines being smaller than a size of a cross section of said filter member of the light beam incident thereon.

5. The optical type position detecting device as set forth in claim 4, wherein a transmittance distribution of said first section is set so that the light beam transmitted through said first section has a uniform distribution of light intensity along the directions of the relative displacement.

6. An optical type position detecting device comprising:

a light source;

a light-receiving element for detecting a light beam emitted by said light source; and a light interrupting member disposed between said light source and said light-receiving element, in a path of the light beam;

said light-receiving element being provided with a light-receiving section;

said light-receiving section having a first side which extends in a direction parallel to a direction of relative displacement of said light-receiving element, whereon the light beam is incident;

said light interrupting member being provided with a cutaway section having a second side which extends in a direction parallel to the direction of relative displacement, a distance between said first side an a projection of said second side on said light-receiving element being set to be smaller than a size of a cross section of said light-receiving element of the light beam incident thereon;

said relative displacement being detected by using said light-receiving element to detect a change in area of the region, the change in the area accompanying the relative displacement.

7. An optical type position detecting device comprising:

a light source;

a light-receiving element, provided with four light-receiving sections separated by two orthogonal parting lines, for detecting a light beam emitted by the light source; and region setting means for setting two parallel pairs of boundaries to a region of said light receiving element whereon the light beam is incident, a relative displacement of said region and said light-receiving element being detected by comparing outputs of said light-receiving sections.

8. The optical type position detecting device as set forth in claim 7, wherein said region setting means consists of a light interrupting member disposed between said light source and said light-receiving element, in a path of the light beam;

said light interrupting member having an opening which includes two parallel pairs of sides, a distance between said sides of each of the parallel pairs being set to be smaller than a size of a cross section of said light-interrupting member of the light beam incident thereon.

9. The optical type position detecting device as set forth in claim 8, wherein two parallel pairs of the sides are orthogonal and two parallel pairs of the sides are respectively parallel to the two parting lines.

10. The optical type position detecting device as set forth in claim 7, wherein said region setting means consists of a filter member disposed between said light source and said light-receiving element, in a path of the light beam;

said filter member having a first section which allows the light beam to be easily transmitted and a second section which, compared to said first section, prevents the light beam from being transmitted easily;

said first section and said second section being separated by two parallel pairs of boundary lines, a distance between the boundary lines being smaller than a size of a cross section of said filter member of the light beam incident thereon.

11. The optical type position detecting device as set forth in claim 10, wherein two parallel pairs of the boundary lines are orthogonal and two parallel pairs of the boundary lines are respectively parallel to the two parting lines.

12. The optical type position detecting device as set forth in claim 10, wherein a transmittance distribution of said first section is set so that the light beam transmitted through said first section has a uniform distribution of light intensity along directions of the relative displacement.

13. The optical type position detecting device as set forth in claim 12, wherein two parallel pairs of the boundary lines are orthogonal and two parallel pairs of the boundary lines are respectively parallel to the two parting lines.

* * * * *